March 16, 1965     J. H. LEMELSON     3,173,175
MOLDING APPARATUS

Filed May 9, 1958     7 Sheets-Sheet 1

INVENTOR.
Jerome H. Lemelson

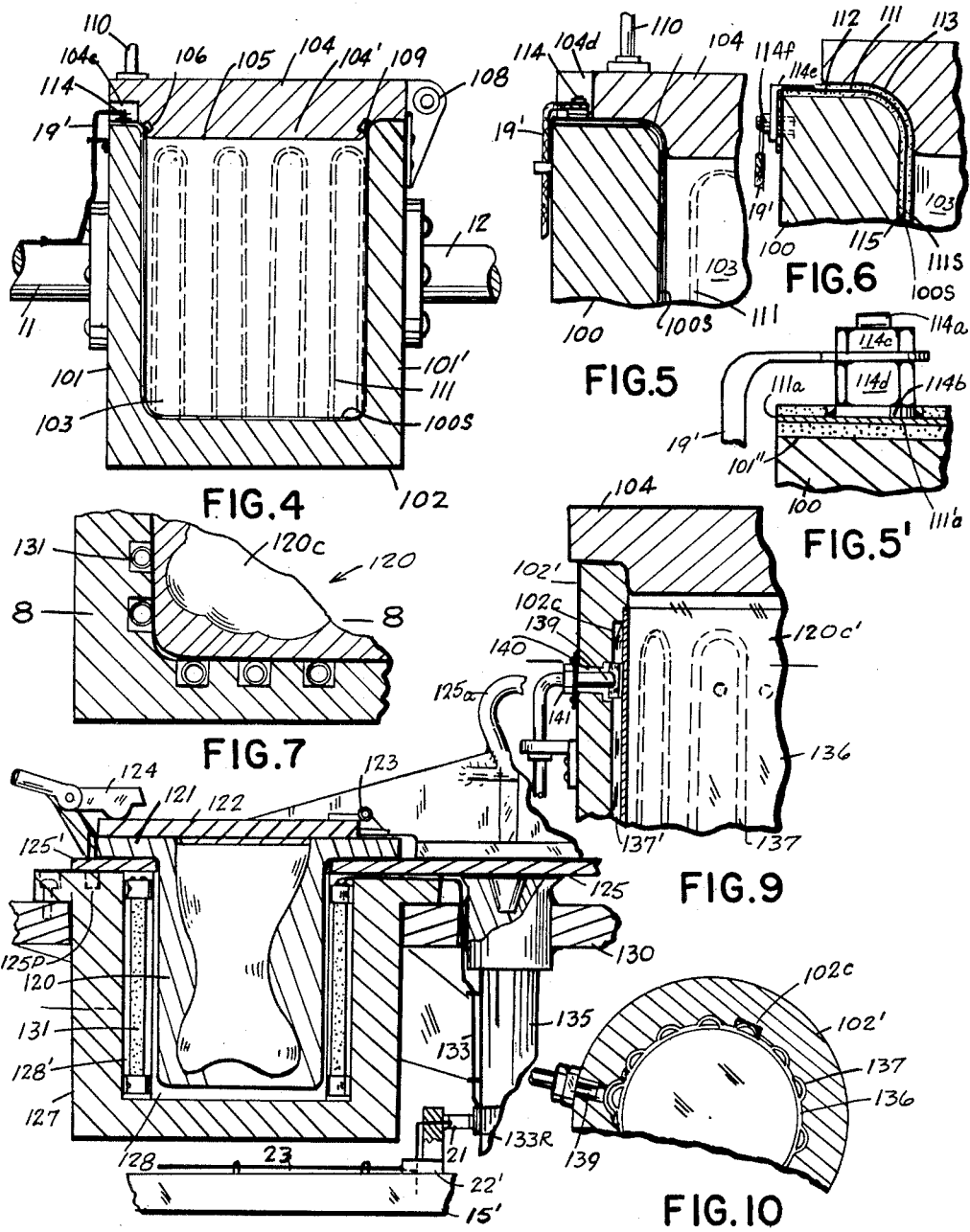

March 16, 1965   J. H. LEMELSON   3,173,175
MOLDING APPARATUS

Filed May 9, 1958   7 Sheets-Sheet 3

*INVENTOR.*
Jerome H. Lemelson

March 16, 1965 — J. H. LEMELSON — 3,173,175
MOLDING APPARATUS
Filed May 9, 1958 — 7 Sheets-Sheet 4

INVENTOR.
Jerome H. Lemelson

March 16, 1965

J. H. LEMELSON 3,173,175

MOLDING APPARATUS

Filed May 9, 1958

INVENTOR.
Jerome H. Lemelson

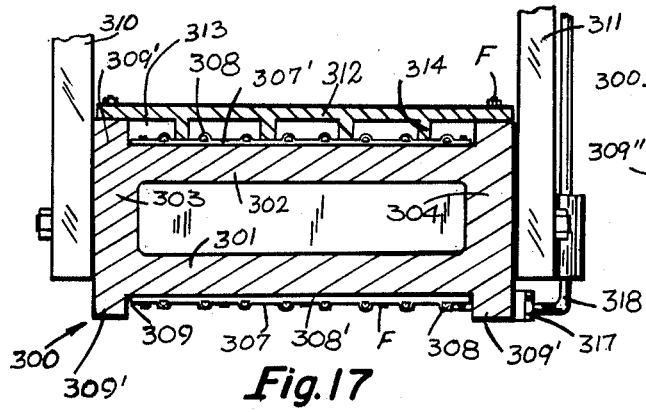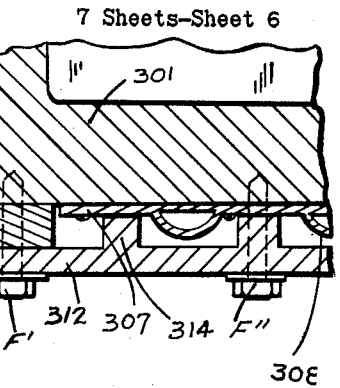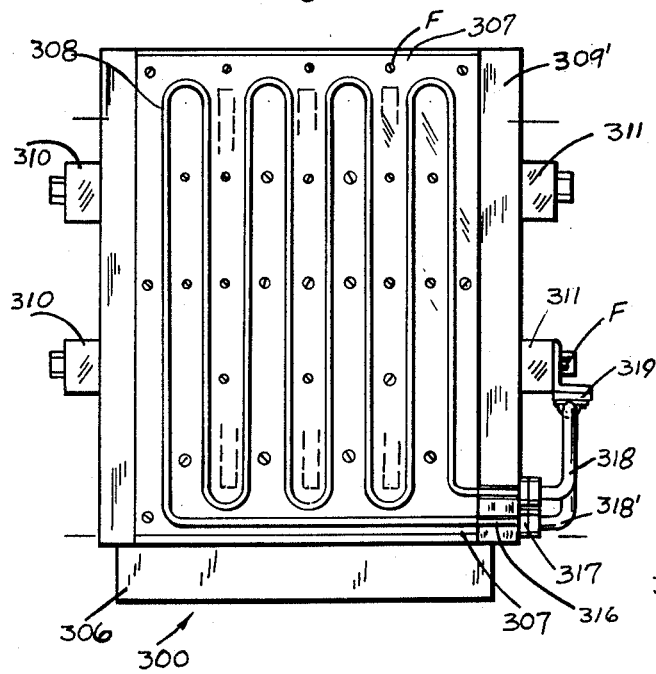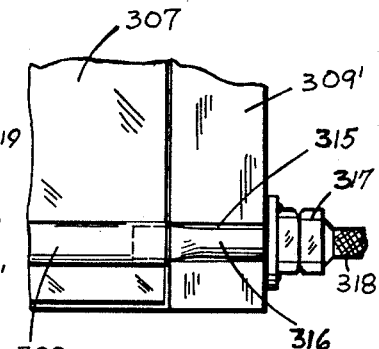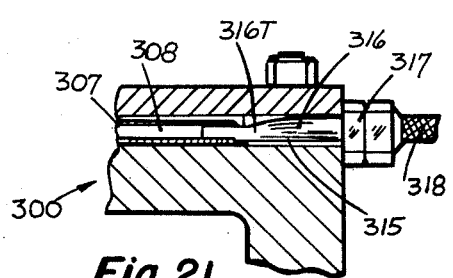

March 16, 1965  J. H. LEMELSON  3,173,175
MOLDING APPARATUS
Filed May 9, 1958  7 Sheets-Sheet 7
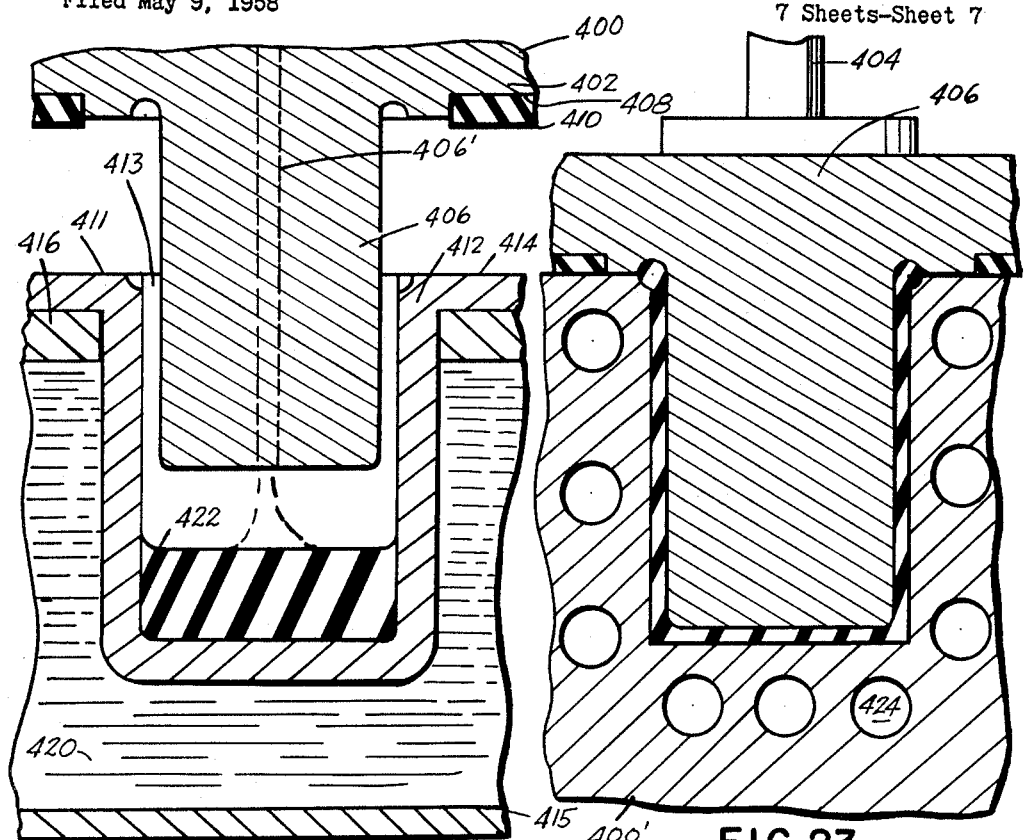
FIG. 22
FIG. 23
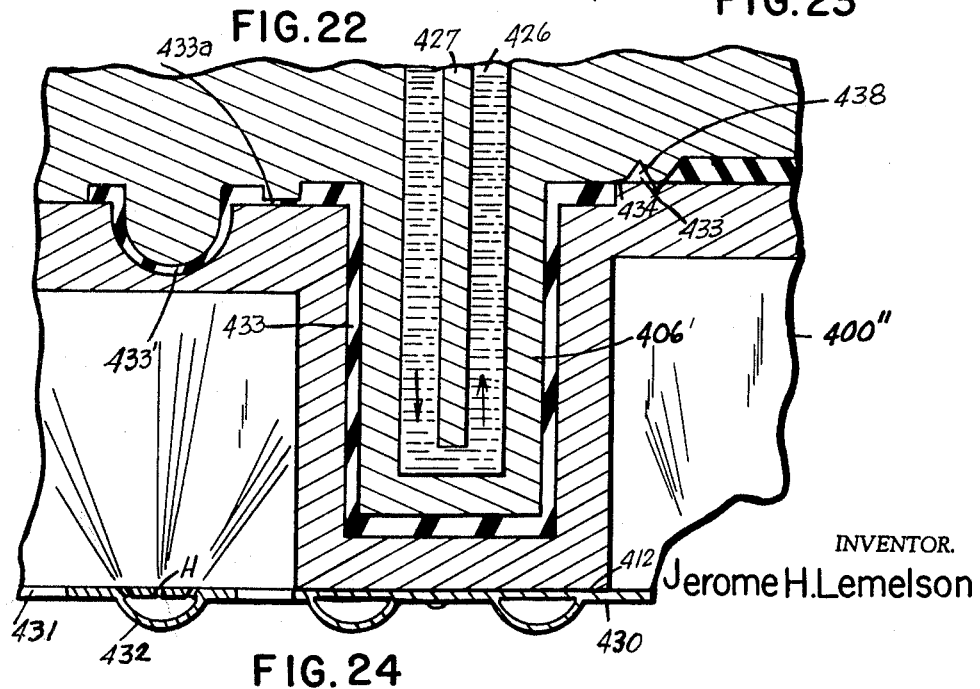
FIG. 24
INVENTOR.
Jerome H. Lemelson

United States Patent Office 3,173,175
Patented Mar. 16, 1965

3,173,175
MOLDING APPARATUS
Jerome H. Lemelson, 43A Garfield Apts., Metuchen, N.J.
Filed May 9, 1958, Ser. No. 734,340
16 Claims. (Cl. 18—26)

This invention relates generally to improvements in the design and construction of molds and molding apparatus and specifically to the design of apparatus for making hollow articles by injecting liquid plastics into molds at relatively low molding pressures.

In the art of molding hollow bodies from liquid plastic materials such as vinyl plastisols, organisols and the like, so called slush molding techniques are employed wherein said plastic is admitted to a mold at relatively low pressure as compared to conventional injection molding and is caused, by virtue of its filling the mold or by movement of the mold, to contact the entire interior surface of the mold cavity. Formulations of vinyl plastisols will solidify on the wall of the mold and form a shell if said mold is heated to a predetermined temperature. Formulations of other low pressure molding plastics such as blends of high molecular weight and low molecular weight polyethylenes made molten by heating will solidify on the surfaces of the mold cavity as a result of heat transfer thereto and the lowering of the temperature of said liquid plastic. Apparatus for molding plastics of these types has been developed which suffer a number of important shortcomings. Machinery employing multiple molds for slush molding vinyl plastisols comprises means for conveying said molds through a furnace which is cumbersome, space consuming and relatively expensive to produce and operate. A considerable amount of fuel or electrical energy must be expended to heat an object such as a mold passing through a furnace and heat is wasted when said mold enters and leaves the furnace. Apparatus utilized for molding low pressure polyethylenes suffers a number of shortcomings, one of which is the requirement that the dynamic pressure of a fluid such as air be used to support the molding from within the mold from collapsing until it has completely solidified.

It is a primary object of this invention to provide new and improved molding apparatus which may be operated at relatively low molding pressures.

Another object is to provide new and improved molding apparatus for the low pressure slush molding of thermoplastic materials having means whereby the cycle time required to mold an article is substantially reduced over that required to mold the same article by conventional slush molding means.

Still another object is to provide new and improved apparatus for molding large articles of thermoplastic material which is fed to a mold at low pressure and solidifies on the wall thereof as the result of heating said wall, without the need for a large furnace to heat said mold.

Another object is to provide improved apparatus for molding articles of thermoplastic materials at low pressure involving the use of heat and the motion of a mold to distribute said material on a surface of said mold, said apparatus also including simple and improved means for rapidly dissipating said heat so as to shorten the time it takes to mold an article.

A further object is to provide new and improved designs for molds used for casting or molding articles out of thermoplastic materials, including improved means for heating and/or cooling said molds.

Another object is to provide apparatus for molding a thermoplastic material fed to a mold which solidifies in said mold as its temperature drops, with means for automatically controlling the temperature of the walls of said mold by varying it in a predetermined manner during a molding cycle so that the time it takes for said material to solidify in said mold is substantially reduced.

Yet another object is to provide apparatus for molding hollow bodies of low pressure molding materials which may be operated in a semi-automatic or automatic manner to produce a hollow body of a predetermined wall thickness thereby eliminating waste of molding material due to the use of excess material and scrap caused by misjudgment when manually controlled.

Another object is to provide improved automatic molding apparatus including a movable or rotatable mold and means for automatically admitting a molding material to a cavity thereof without the need for manual attendance to said apparatus.

Still another object is to provide automatic apparatus for molding articles of low pressure moldable plastics in a mold and for removing said articles from said mold without the need for human attendance to said apparatus.

Still another object is to provide a new and improved construction for a simple and light weight rotatable heated container for use as a mold or the like.

FIG. 4 is a side view in partial cross section of an electrically heated mold applicable to the apparatus of FIG. 1;

FIG. 5 is a fragmentary view of a modified form of the mold of FIG. 4;

Figure 1:
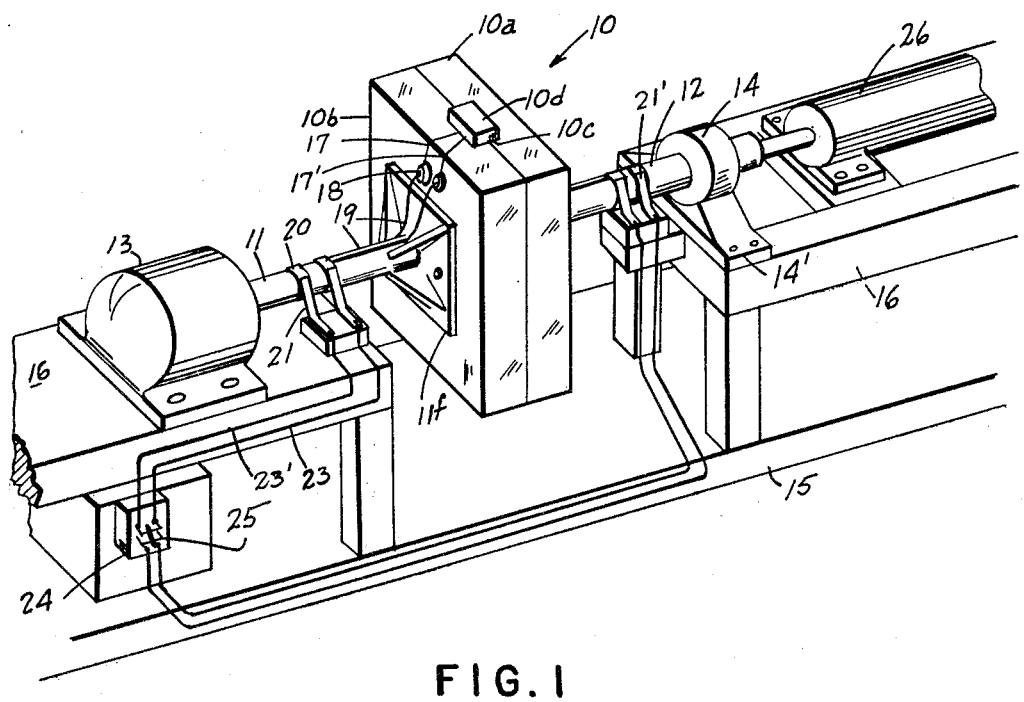
FIG. 1 is an isometric view of a molding apparatus made in accordance with the teachings of this invention.
Figure 11:
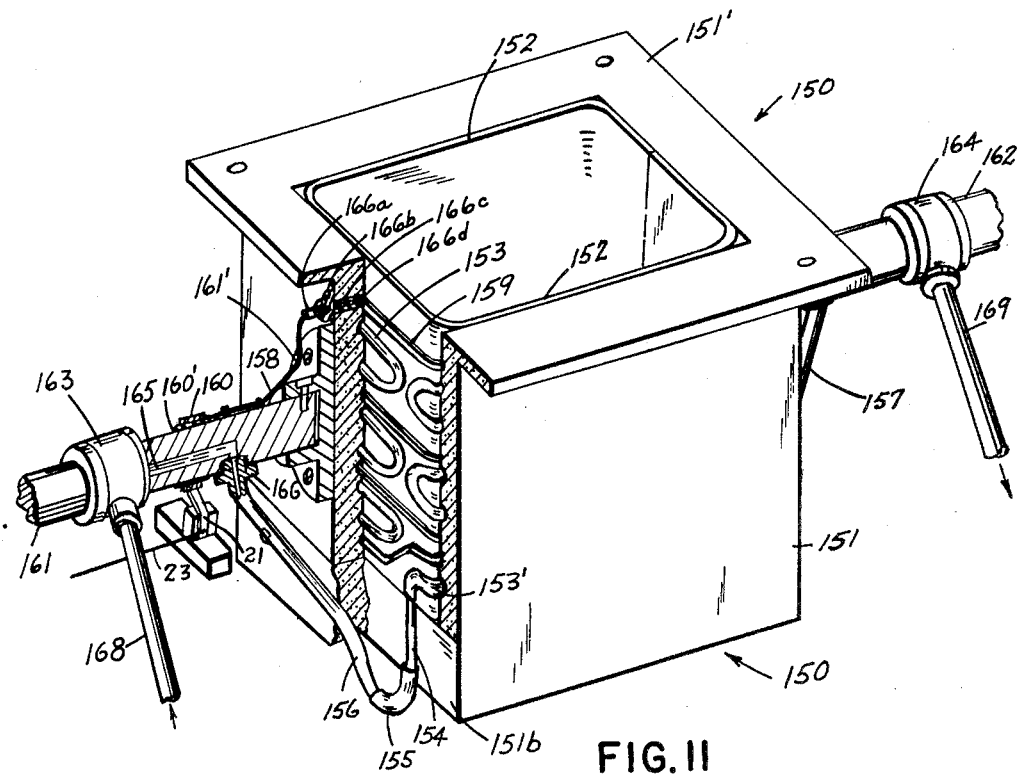
Figure 11A:
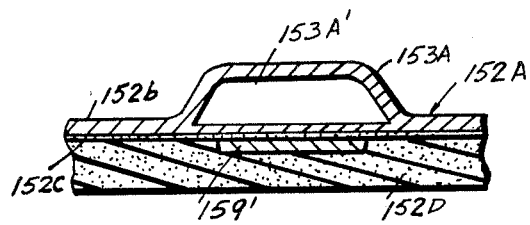
Figure 12:
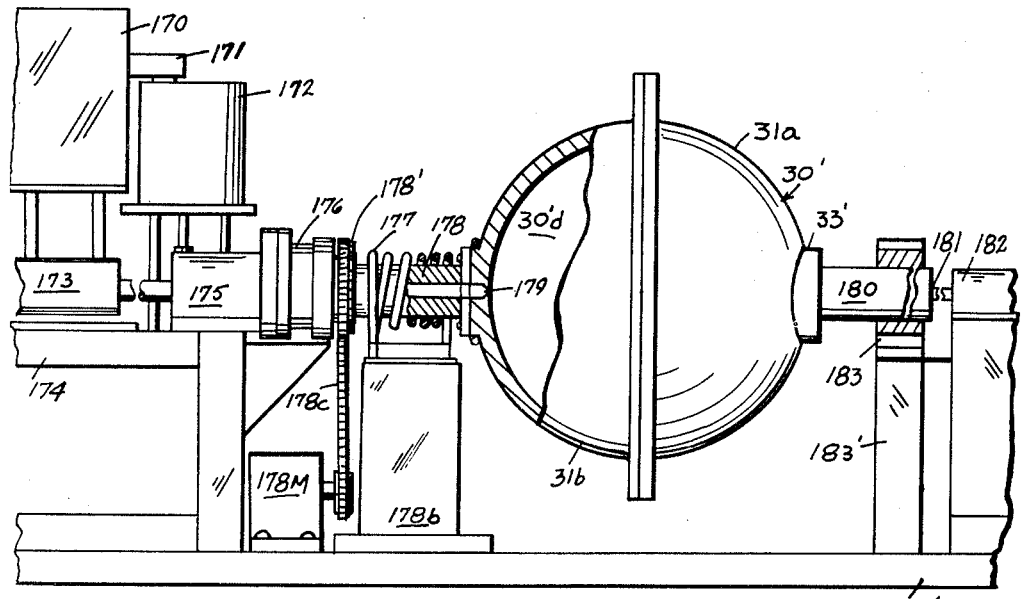
Figures 13, 14:
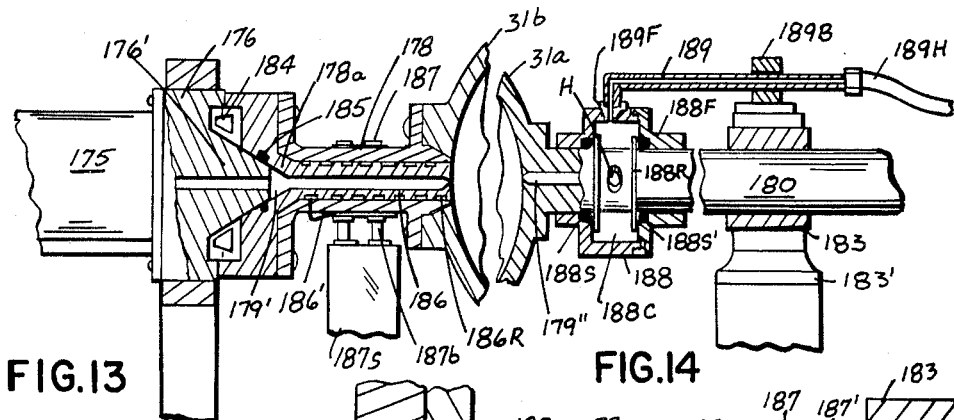
Figure 15:
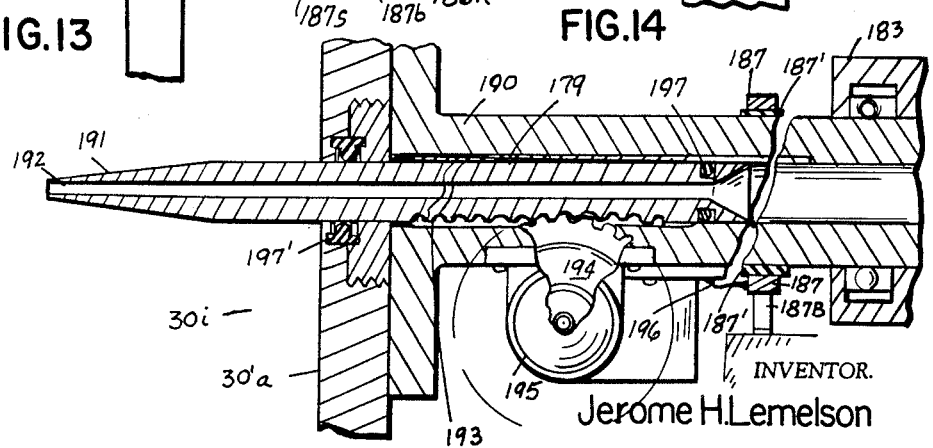
Figure 16:
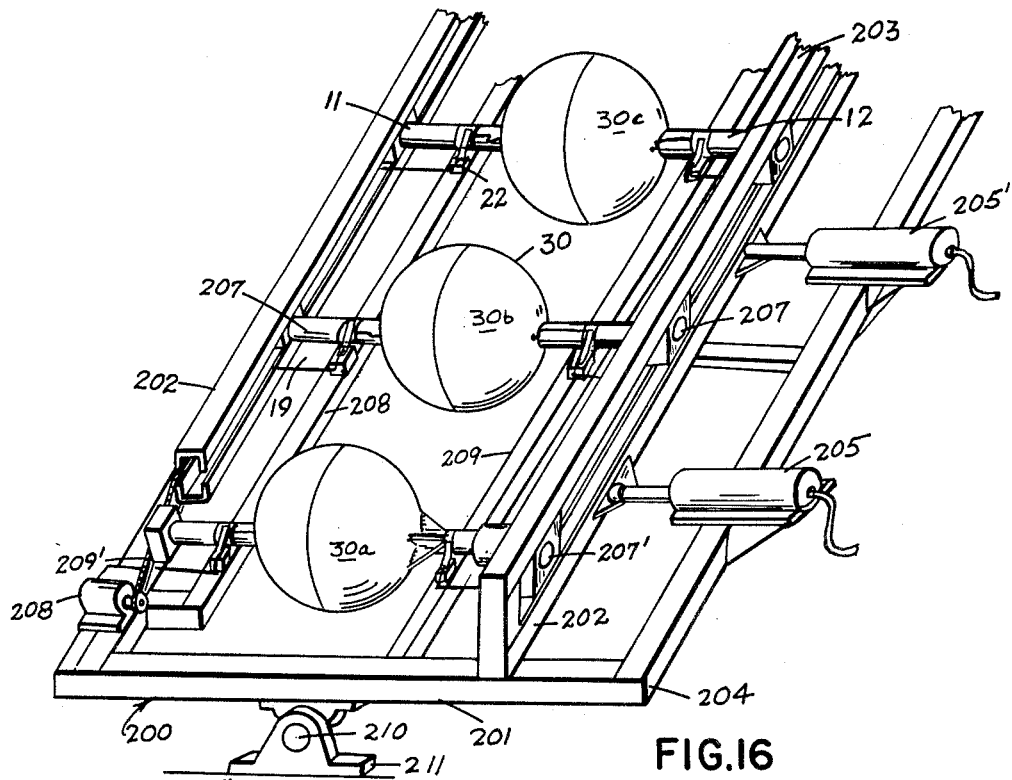
Figure 16:
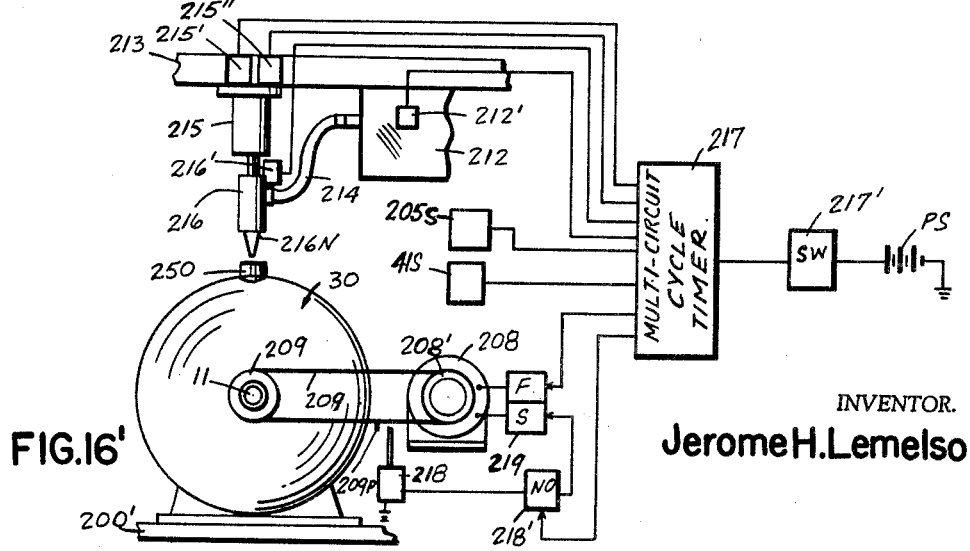

FIG. 5' is a fragmentary view in cross section showing means for electrically connecting to an electrical heating element integrally formed as a portion of a mold;

FIG. 6 is a fragmentary view in cross section of a modified form of electrically heated molds;

FIG. 7 is a fragmentary view in cross section of a modified form of electrically heated molds;

FIG. 8 is a side view taken in cross section of a mold and support therefor including means for heating said mold electrically;

FIG. 9 is a fragmentary view in cross section of a mold having a liquid heat transfer means;

FIG. 10 is a fragmentary view in cross section of the mold illustrated in FIG. 9;

FIG. 11 is an isometric view with parts broken away for clarity of a modified form of mold having both electrical and fluid heat transfer means;

FIG. 11a is a cross sectional view of a fragment of a portion of the mold of FIG. 11;

FIG. 12 is a side view with parts broken away for clarity of a modified form of the molding apparatus illustrated in FIG. 1;

FIG. 13 is a side view with parts broken away for clarity of a modified form of the apparatus of FIG. 12;

FIG. 14 is a side view with parts broken away for clarity of another modified form of the apparatus of FIG. 12;

FIG. 15 is a side view with parts sectioned and broken away for clarity of a mold injection means applicable to the apparatus of FIGS. 1 and 12;

FIG. 16 is an isometric view of a molding apparatus having a plurality of molds of the type illustrated in FIGS. 1 and 12;

FIG. 16' is a schematic diagram of means for cyclically controlling a molding apparatus of the type comprising this invention;

FIG. 17 is a top view taken in cross section of a fluid cooled molding apparatus;

FIG. 18 is a partial view in cross section of a modified form of the apparatus illustrated in FIG. 17;

FIG. 19 is a side view of the apparatus of FIG. 17;

FIG. 20 is a side view of a fragment of the apparatus illustrated in FIG. 19;

FIG. 21 is an end view taken in cross section of FIG. 20;

FIG. 22 is a side view in cross section of a modified form of molding apparatus including a mold and a plunger injector;

FIG. 23 is a side view in cross section of a modified form of the apparatus 22 and FIG. 24 is a side view in cross section of a portion of apparatus which is a modified form of the apparatus of FIGS. 22 and 23.

The apparatus of FIG. 1 comprises a two-piece mold 10 consisting of mold half sections 10a and 10b which, when assembled as shown, provide an internal cavity accessible from the outside through a gate opening 10c having a plug 10d for closing off said opening. The mold 10 is shown held in clamping engagement between two shafts 11 and 12 each provided with a flanged end fixture 11f, not shown, which are respectively secured by welding or fasteners to each of said mold halves. The shaft 11 is supported in bearing by the journals of a motor and drive unit 13 and shaft 12 is supported by a pillow block 14. The base 14' of pillow block 14 is movably mounted on a base 16 so that shaft 12 and the mold half 10a, supported thereby, may be moved axially to separate said mold half from the other mold half 10b. Thus by withdrawing 14 or shaft 12 therein the mold sections may be separated and a shaped article in the mold may be removed therefrom. If a heat cured, thermoplastic material is to be slush molded to the shape of the cavity formed by the assembly of the molds, the entire surface of the cavity wall must be heated to cure the plastic. While a flame may be directed against the exterior of each mold and the resulting heat conducted therethrough to the cavity as the mold rotates to distribute the liquid plastic provided therein, in FIG. 1 electrical heating means is provided as an integral part of each mold half or removably associated therewith thereby eliminating the need to dissipate a lot of heat which is wasted, by applying heat directly to the area to be heated and reducing the time required to heat the mold. The electrical heating means may comprise, in addition to means for conducting electrical energy to the mold halves as they rotate, one or more heating elements secured to the interior as an integral formation on the interior surface of the cavity of the mold or in sandwich construction as part of the mold wall. The numerals 17 and 17' refer to conducting leads as part of a circuit containing the electrical resistance heating elements associated with the mold half 10b. Said leads or wires 17 extend from respective points on the mold half where they connect to said mold heating elements, not shown, to wires 19 along the shaft 11 to respective slip rings 20 which are insulated from said shaft. An electrical sliding contactor or brushes 21 ride on the rings 20 for conducting electrical energy from a power supply 24 through wires 23 and 23' to the resistance heating elements as the shaft 11 rotates. One of the rings may be eliminated by merely grounding the shaft 11 and connecting said ground to the ground of said power supply. A similar electrical connection is also provided for the mold half 10a with said brushes being connected to a power supply 24 through a double pole switch 25.

In FIG. 1, a fluid actuated ram or cylinder 26 is shown secured to mount 16 which is secured to the base 15. The ram of said cylinder is connected to shaft 12 for longitudinally moving said shaft in the bearing 14 to separate mold section 10a from 10b when the ram 26' thereof retracts and to bring it together when said ram is projected with sufficient force to seal the cavity formed by assembly of the two mold sections. The operation of ram 26, motor 13 as well as the switch 25 may be automatically controlled by a multi-circuit timer or the like.

Figure 2:
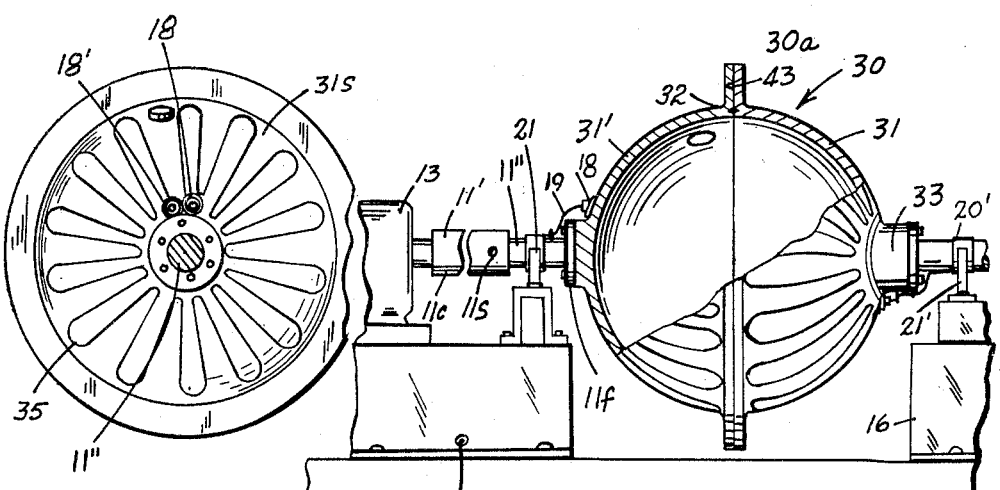
FIG. 2 is an end view of a portion of a mold applicable to the apparatus of FIG. 1.
Figure 3:
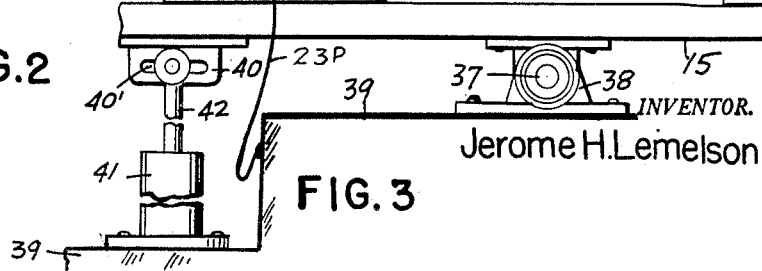
FIG. 3 is a side view with parts broken away for clarity of a modified form of the apparatus of FIG. 1.

FIGS. 2 and 3 are views showing further details of modified apparatus in the realm of that shown in FIG. 1 wherein the mold comprises an assembly 30 of semi-spherical half mold sections 31 and 31' having relatively thin plate-like walls which may be utilized for the manufacture of large balls and the like. The mold of course, may have any shape which permits the application of the constructional features to be described. A single piece or unit mold which does not split as shown may also be provided which conforms to the general construction illustrated, whereupon the soft plastic shell molded therein would be pulled or stripped from said cavity through an opening therein. A flange circumscribes each mold-half and is adapted to mate with a similar flange projecting from the rim of the other mold-half. A seal in the form of a metallic or silicone O-ring 32 seats in a groove in the mating surface of one of the flanges and prevents leakage of liquid plastic from the mold while said mold is rotating and assembled.

The mold-half section 31' is secured by means of a flange 11f to a shaft 11' extending from an electric gearmotor unit 13 and is rotatable therewith. A pin 43 secured to and projecting from the flange 30a of mold half 31 engages in an aligned hole in the flange 30b of the other mold-half section 31' so that the assembled mold-halves will align and rotate together without slippage. The shells 31 and 31' are each provided with flat faced portions 33 of increased cross-section in the area of the axis of rotation as shown to provide a simple mount for the end flanges of the respective shafts and a base in which to provide holes for securing fastens holding said fasteners.

FIG. 2, an end-elevation of the mold half-section 31', shows a preferred means of heating said mold section. A resistance heating element 35 is shown secured to and extending in essentially a symmetrical pattern about the exterior surface 31s of the mold shell. Any type of suitable electrical resistance heating element may be employed provided that it heats the interior surface of the mold to the desired temperature in the desired time. Most slush molding vinyl compounds require mold curing temperatures in the range of 550 to 750 degrees Fahrenheit. A preferred type of heating element is nickel-chromium wire wrapped in asbestos tape or suspended in a compressed mass of an asbestos composition. Such elements come in ribbon-like shapes which may be secured to the exterior surface of the mold in most any zig-zag or reversing pattern such as the petal-like pattern illustrated. The resistance wire or tape comprising 35 may be secured to the exterior 31s of the mold-shell with small self-tapping stainless steel screws or with a high temperature bonding agent such as asbestos cement or suitable ceramic cement.

The reference numerals 18 and 18' refer to electrical connectors such as female plug receptacles connected to each end of the conductor of the resistance element 35 and secured to their respective mold sections, to which the wire 19 is connectable which extends along the shaft 11 to a commutator ring as hereinabove described for electrical energy conduction to said element while the mold is rotating. The plugs 18 and 18' permit the mold or mold halves to be disassembled and replaced with others without having to sever the wires. In the apparatus of FIGS. 2 and 3, one end of each resistance element is assumed to be grounded on the respective mold-half which in turn is grounded through the shaft and motor or pillow block thus completing a circuit with a power supply 24 through the brushes 21 or 21' riding on respective rings 20 and 20' which are insulatedly mounted on their respective shafts. The numeral 11c refers to a sliding coupling joining the two shaft sections 11' and 11" so that a longitudinal adjustment may be made in the position of the end of the shaft which connects to the mold section 31'. Thus, if it is desired to replace one mold with another which is of a different shape and, in particular, varies in width or distance between the surfaces of the built-up sections 31, 31' to which said shafts are secured, longitudinal adjustment may be made to accommodate said variations by sliding shaft end-section 11″ in or out of tubular coupling 11 which is preferably splined, and tightening one or more set-screws 11s provided in threaded holes in 11c against 11″ to prevent axial movement of said shaft.

Since it may be desirable to change the attitude of the axis of rotation of the mold as it rotates, in order to distribute the liquid plastic more evenly about the surface of the mold, a means is provided and shown in FIG. 3 for effecting said change in attitude. The mounts 16 and 16′ for the drive unit 13 and bearing as well as lineal actuator for shaft 12, not shown, are secured to a frame or platform 15. A shaft 37 is secured to 15 by means of brackets or pillow blocks 38, which is pivotable on a pair of bearing blocks one of which 36 is shown secured to the base 39 or floor. A fluid cylinder or lineal motor 41 secured to 39 has its shaft 42 pivotally attached via an end fitting to a fixture 40 with a slotted hole 40′ therein. Thus, when shaft 42 is urged by the lineal motor 41 to move up and down, the platform pivots about the axis of shaft 37 and the attitude of the axis of rotation of shafts 11 and 12 may be changed as the mold rotates.

A wire 23P extends from brushes 21 to a connector secured to the base 39 below. 23P is of sufficient length that it will not be pulled taut and sever when 15 is moved to its maximum tilting positions and connects a power supply to the resistance heating elements 35 secured to the mold through the brushes. A suitable heating element comprising 35 is an interwoven resistance grid bonded in a sheet carrier made by Electrofilm, Inc. of N. Hollywood, California.

In FIG. 4, is shown constructional details of molding apparatus applicable to the apparatus of FIGS. 1 to 3 or the like. A two-piece mold is shown having a wall or body 100 made of metal, ceramic or other suitable material with an opening at the top which may be closed off confining the interior volume 103 by means of a lid or top 104 which is pivotally mounted on a hinge 108 secured to the side-wall 101′ of the lower container. Shafts 11 and 12 are shown secured by means of flanged connectors to respective sides 101 and 101′ of the container 100 for the rotation or rocking movement thereof as described. The top 104 is shaped with a downwardly projecting plug portion 104′ adapted to project into the open end thereof for effecting a seal which may be enhanced by means of an O-ring 109 secured in a groove 106 therein and circumscribing the upper rim of the mold body 100. The numeral 110 refers to a handle for lifting the top to remove the molding therefrom and a conventional latch, not shown, or locking means may be provided to hold the top 104 in place while the mold is being rocked or rotated. The cross-sectional view shows the heating element such as a layer of metal which is embedded in an insulating material, extending as a flat strip 111 in one or more circuits around the interior of the container. The resistance heating element 111 may comprise a rolled or sprayed on strip of aluminum, copper or other metal or nickel-chromium alloy and is shown in FIGS. 5 and 6 as applied to a first insulating layer 112 which may comprise a glass or ceramic material such as a porcelain glaze material, glass-ceramic or the like applied in an integral bond to the entire interior surface of 100 including the upper surface of the rim of said mold. The metallic resistance element 111 may be provided in the zig-zag or looped pattern shown which extends across the inside surface of the bottom 102 of the mold and up the walls thereof which are not shown in one or more continuous circuits which terminate near the outer edge of the upper surface 101″ of the rim of the mold for connecting electrical leads thereto which extend as shown in FIG. 4 along the outer surface of the mold and along the adjacent shaft to a contactor ring, not shown, in accordance with the teaching of FIGS. 1 and 3.

The inner edge of the upper rim of the main body 100 of the mold is rounded as shown for two purposes, namely to provide a smooth contour along which the electrical heating element may extend without experiencing a sharp inflection or bend and to provide a smoothly contoured surface against which the lid or top 104 will not sever or damage the insulating material or the electrical element 111. Similarly, the interior surface 100s of the cavity 103 is rounded or smoothly contoured as shown.

After the ceramic or porcelain layer 112 has been applied, and integrally bonded to the surface of the cavity in the mold section 100, the element 111 may be applied thereto as a formed strip of metal with a suitable high temperature ceramic cement which may be temperature cured by passing electrical energy through said resistance element 111 for the necessary period of time. A ceramic cement manufactured by the Corning Glass Works of Corning, New York and known as "Pyroceram" brand cement, No. 95, maybe applied to the rear surface of a strip of metal in the looped shape shown for 111, and will fire at between 400 to 450° C. If the temperature is maintained by means of generating heat in said strip 111 by passing current therethrough an excellent bond will be attained. A groove, the contour of the illustrated heating element, may be provided in the interior surface of 100 so that said heating element will not project beyond the plane of the surface and said surface will be smooth.

The notation 104c in FIG. 4 refers to a cavity or indentation in the under-surface of the lid 104 which is provided to permit an electrical connector 114 such as a lug at the end of wire 19′ to be secured to an end of the resistance element 111 for conducting electrical energy thereto. The cavity 104c in 104 will not be necessitated if the element 111 is extended beyond the surface of 104 which engages surface 101′ or if the resistance element is brought over the edge of the rim to the exterior surface of 100 or into a cavity provided in surface 101′ and extending to the outer edge thereof.

Means for electrically connecting wire 19′ to the element 111 are shown in FIGS. 5 and 6. In FIG. 4, the lid 104 is notched at 104d near an edge thereof exposing a portion of the surface of the layer 100s containing the conducting element 111. The end of wire 19′ may be welded or soldered to a surface of 111 which is exposed through the layer 100s.

In FIG. 6, the layer 100s comprises a first coating 112 of ceramic or glass material such as a porcelain or ceramic cement fused onto the interior surface of 100 to which the element is bonded over which, in an area either just covering 111 or as a general coating on the interior surface 103 of the mold cavity is applied a second coating 113 of a ceramic or glass material, which is preferably fused by heat thereon. A preferred construction includes the application of said second coating 113 by means of spraying, casting or other means such that, after it is applied and covers the entire inside surface of the cavity 103 including the fused-on conducting heating element 111, said surface is smooth and free of irregularities such as projecting ridges which may be caused for example by the strip element 111. This may be accomplished by securing strip 111 in a recess of similar contour and provided in the layer 112 or in the interior surface 100s of the mold 100 as shown in FIG. 4′. Such a mold may be used for molding smooth walled objects and containers.

Details of the means for securing the end of wire 19′ to the conducting strip portion 111a which extends along the surface 101″ are shown in FIG. 5′ which shows an electrical stand-off pin 114a having a flanged lower end 114b welded or soldered to an exposed portion 111′a of 111a, the exposure of the upper surface thereof being provided by removing part of the overlayer 113 therefrom by means of a grinder or milling tool. An electrical connector lug 114b is secured to 114a by conventional means. The upper end of 114a is threaded and two nuts 114c and 114d hold 114b thereon. The notation 19s of FIG. 5 refers to a hold-down fastener for securing wire 19′ against the outer surface of mold 100 to prevent its motion when the latter is rotated.

In FIG. 6 the conducting element 111 is bonded to the inside surface of a sheet of material 115 which comprises a sheet of metal 115a shaped as a container having its outer surface adapted for surface engagement with the interior surface of the mold 100 and its inside surface coated with a ceramic such as porcelain or a glass ceramic such as Pyroceram in which is embedded or secured said element 111 in sandwich assembly by one of the methods described for FIGS. 4 and 5. The heating element 111 is thus secured in a layer of insulating material bonded to a sheet of metal which is fastened or welded to the wall 100. The cup-like heater liner 115 may be drawn, stamped or otherwise formed from sheet metal or may be formed to any desired thin shell shape, for example of aluminum by casting, or of copper by electroplating on a base. After its formation, the interior surface is coated with a ceramic, electrical insulating material as described which is fused thereon with heat, and the heating element 111 is applied by spraying, plating or as a thin strip of metal after which the entire interior surface is again coated with a ceramic material which is fused by heat. So as not to change the interior contour of 115, it may also be formed by casting, electroplating, machining or other means and the exterior surface thereof coated with a ceramic insulating material to which heater element 111 is applied and covered with a further coating of ceramic material. The shell 111s' of FIG. 6 would have its array of materials reversed in the order shown with the interior thereof being the metal wall section 115.

The connecting means of FIG. 6 includes a lug 114e shaped in the form of an angle, the upper end of which is welded or soldered to an exposed portion of the end of conductor 111 the lower end of which lug is secured to the side-wall of 100 by means of a fastener 114f which screws into an insulated insert held in a hole in 100. The lower end of 114e has an insulated coating on its under-surface to insulate it from the surface of 100 or is held thereoff by means of 114f.

FIGS. 7 and 8 show details of further variations in the construction of heated molds applicable to this invention. Mold 120 is provided which is secured by means of a flanged upper portion 121 thereof held against a frame or plate 125 preferably mounting a plurality of said molds. The mold 120 is shown secured to a holding fixture and projects into a container 127 having essentially the same internal contour as the exterior of the lower portion of 120. A plurality of elongated cavities 128' extend inward from the main cavity 128 in 127 and in each is secured a resistance heating element 131. The heating elements 131 are spaced to provide sufficient heat by radiation to the exterior surface of the mold to heat the interior surface of each the desired degree as the mold is rotated or oscillated. The flange 121 of the mold 120 is secured a fixture 125 by means of fasteners or rivets and the plate portion of said fixture is removably secured by means of clamps or fasteners to either the tops of the heating boxes 127 or the frame 130 on which said containers 127 are mounted. After the completion of a molding operation, the fixture 125 and molds 120 held thereby may be lifted by means of a hook 125a and a hoist connected thereto, after releasing the means securing 120 against 125 so that the molds will cool more rapidly and the molded parts may be easily removed without need for cooling the heater containers 127. Upon removal of one fixture and its molds from the assembly of heater boxes, a new fixture with associated molds may be lowered to the position shown in FIG. 8 for another cycle.

The heater box frame 130 is shown secured to a column 135 which is rotatable by means of a drive and support, not shown, and preferably tiltable in the manner taught in FIGS. 1 to 3 so that the axis about which the molds 120 rotate may be changed in attitude thus allowing the liquid within the molds to flow over the entire interior surfaces of the cavities in each. The conduction of electrical energy to the heating elements 131 from power supply remote from said apparatus is effected in the same manner as taught in FIGS. 1 to 3. A cable 133 extends from the circuit of said elements 131 to the shaft 135 and therealong to a conducting ring 133R insulatedly mounted on said shaft against which an electrical brush 21 sweeps as it rotates with said shaft. The brush 21 is mounted on an insulating block 22' which is secured to the base or frame 15' on which bearing support means for shaft 135 adn drive motor are mounted. A wire 23 extends therefrom for conduction of electricity to said brush. Frame 15' like 15 may be automatically tiltable as 135 rotates by any suitable means to vary for example the axis of 135 from the vertical to horizontal. The numeral 124 refers to a clamp welded to flange 121 of 120 which engages and holds mold cover 122 thereagainst. Notation 123 refers to a hinge for mold lid 122, and 125p refers to a pin protruding from 125 for indexing said fixture with the molds centered in the heater box cavities 128 by seating in respective holes in either the upper surfaces of 127 or in frame 130.

FIGS. 9 and 10 show details of the construction of a mold applicable to the apparatus of this invention which employs a liquid or other fluid, as a means for heating and/or cooling the mold inner surface. In FIG. 9 a lid or cover 104 is provided which seals the interior volume 120c' of a mold 102' when clamped or bolted against the rim thereof. Said mold and cover may be metal, ceramic coated metal, ceramic or a ceramic glass. Provided as a liner for the interior wall of mold 102' is a sheet of metal 136 having a duct 137 integrally formed in said sheet. The wall of the integrally formed duct which faces inward is in the plane of the surface of the sheet and the other wall of the duct protrudes or bulges beyond the other wall of the sheet 136. In order to accommodate the bulging portion of the duct 137, a groove or channel 102c is provided in the inside surface of 102' having a similar contour as the path of 137 so that the remainder of the outer surface of the cylindrically formed sheet 136 abuts the inner surface of 102' which serves as a support therefor. The tubed sheet 136 is preferably made of stainless steel or other ceramic, ceramic frit, or porcelain coated steel or any suitable metal or alloy capable or resisting corrosion when heated to the molding temperatures required of the material placed threin. The notation 137' refers to an end portion of the integral duct 137 to which a liquid is conducted via a tube 139, the end of which is welded or soldered to the bulging wall of 137' adjacent or through a hole therethrough and is held by means of a U-shaped clamp or fitting 139 also welded to 137' and the adjacent sheet. The notation 140 refers to a hole extending through 102' to the cavity in which 137' nests through which 139 passes. The tube 139 is further supported by means of a fitting or collar 141 having a flange which is secured to the outer surface of the wall of 102' with fasteners. The pipe or tube 139 has a 90 degree bend and extends along the wall of 102' to a further fitting or rotary coupling for the flow of a liquid to the mold liner 136. A second tube similar to the one illustrated, but not shown, is coupled to the other end of duct 137 for exhausting the fluid entering through the illustrated.

The heat transfer mold liner 136 may be provided as a cylinder with an open end or with a closed end whereby its bottom is preferably resting on the bottom of 102'. Fasteners such as rivets F flush with the inner surface of 136 may be used to secure said liner to 102' although 136 may be bonded to 102' by welding or by means of a high temperature cement. Flowing a hot fluid such as molten metal such as lead, zinc or aluminum, heated hydraulic liquid, or a salt bath solution through the ducting 137 may be used to cure the cement as well as to heat the wall of the liner 137 to the desired temperature. After heating by such means, and at the end of a heating cycle, the hot liquid still in 137 may be purged therefrom by means of an inert gas under pressure. If a high temperature working fluid is used as the heat transfer fluid, it may be left in the ducting 137 of the sheet without solidification while the mold or container cools or may be replaced by a quantity of the same fluid of considerably lower temperature to cool said container and the material therein more rapidly than by radiation thereby lowering the cycle time. A variety of temperature conditions which are variable in a predetermined manner during a molding cycle are possible by automatic control of the temperature of the liquid entering the ducting 137 of the tube sheet 136. Said temperature control may be effected by means of a sequential switching controller such as a multi-circuit timer controlling solenoids for opening and closing valves for admitting predetermined quantities of said liquids at different temperatures from different reservoirs to said ducting.

If the tubed sheet 136 is coated with ceramic to prevent the heat corrosion thereof, said ceramic may be set or fused at temperature thereon by passing a liquid at a high temperature through said ducts thereof to maintain said tubed sheet at the desired temperature for the time necessary to heat cure or fuse said ceramic coating.

FIG. 11 is an isometric view in partial cross-section showing details of a mold or mold heater box 150 applicable to the apparatus of FIGS. 1 to 3, which employs an electrical heating element for heating the interior portion of the wall thereof and a fluid for cooling said mold during a molding operation so that it is not necessary to wait an extended period of time while the temperature drops to a desired level by radiation cooling thereof. The mold or heater box consists of an outer casing or housing 151 which may be made of metal or ceramic in which housing is secured a liner 152 which comprises a tubed sheet 152.

A pair of shafts 161 and 162 are shown secured to opposite walls of assembly 150 for rotating it in the manner taught in FIGS. 1 to 3, said shafts also serve as means for conveying fluid to the ducting network or system of the tubed sheet 152 while the box or mold is being rotated. Rotary fluid coupling as well as electrical coupling are effected on shaft 161 in FIG. 11 although the other shaft 162 may be used in conjunction therewith. For example, one shaft may be used for rotary fluid coupling while the other one is used to effect rotary electrical coupling to a resistence element 159 which is shown secured to the ducted sheet 152 and extends in a path thereon adjacent the tubing portions 153 thereof which conduit extends in a looped or zig-zag pattern around the box shaped liner formed by 152. The outer casing 151 is shown as having recesses or channels provided about the inside surface thereof to accommodate both the tubing portions 153 and the resistance heating element 159. Said resistance heating element may be secured to the out-casing 151 along the inside wall thereof an if the fluid carrying tubing portion of 152 is replaced by tubing per se secured in channels in 151, then the liner may be easily removed from the casing 151, if necessary, by merely sliding it out of the cavity therein without having to disassemble 151.

In the embodiment illustrated in FIG. 11, the casing 151 is shown as comprising an assembly of a plurality of slab-like walls comprising the sides and bottom thereof. If 150 is used as a mold or heat transfer chamber for containing a liquid such as a plastic, then liner 152 is preferably closed at the bottom and is sealed where its walls are joined by means of welding. A top or lid provided with means for sealing it against the flange 151' may also be provided.

The fluid circuit 153 is connected to a fluid supply system which is fixed in relation to the stationary mount on which 150 rotates and coupling is effected by the provision of a pair of rotary fluid couplings 163 and 164 shown operatively connected to the shafts 161 and 162. One end 153' of the circuit made of the ducting 153 is shown as extending to the bottom edge of the tubed sheet and is coupled by welding, brazing or soldering to a section of straight tube 154 which passes downward through a hole in the bottom 151b of the outer casing 150. The other end of 154 is secured to a section of U-shaped tubing 155 which is secured at its other end to a longer section of tubing 156. A hole 165 is bored axially in the solid shaft 161 which is coupled to the interior of tube 156 by a right angle bore thereto and a fitting 166 sealingly engaged in said right angle bore and connected to said tubing. The axial bore 165 extends to the rotary coupling 163 by means of a further right angle bore through 161 connecting the two and a pipe 168 is secured to the stationary portion of the rotary fluid coupling 163 by means of a fitting. The latter 168 supports 163 and prevents its rotation while the sealing end-portions of 163 which are secured to shaft 161 rotate therewith. Thus fluid entering 168 under pressure will flow to ducting 153 of liner 152 as 150 rotates. Return of the fluid to the low pressure side of the delivery system or to a reservoir where it is heated or cooled may be effected by coring or drilling through part of shaft 162, providing a rotary fluid coupling 164 similar to 163 thereon, connecting a pipe 157 from a second end portion of 153 which extends to another portion of an edge of said liner (not shown) in the manner that 156 was connected to 153' and to the hole through 162 by means of a fitting similar to 166, and connecting the stationary portion of coupling 164 to a pipe 165 which extends to the low pressure side of a fluid circulating, closed cycle system or to a drain.

The shafts 161 and 162 are secured to the side-walls of 150 by means of flanged couplings 161' which are bolted to 151 and are pinned to their respective shafts. Both shafts are supported in bearings and at least one is power driven to rotate by the means illustrated in FIGS. 1 to 3. Electrical energy is conducted to the heating element 157 as the mold rotates by the means illustrated in FIGS. 1 to 3 which includes a slip-ring 160 mounted on an insulating ring 160' and secured therewith to the shaft 161, said slip ring being engaged by an electrically conducting brush 21 for conducting electrical energy thereto, as the former rotates with the shaft said energy supplied on input line 23. The ring 160 is connected electrically to the resistance element of 159 by means of a conductor or wire 158 extending therefrom to a plug 166a shown assembled with a female electric plug 166b secured to the wall of 151 which has a conducting portion passing through wall of 151 and is electrically connected to the electrical element of 159, which may be 159 per se if the latter is a strip of metal sprayed or bonded to an area of 159 which is coated with an insulating material such as a porcelain glaze coating or other suitable material. The numeral 166d refers to a jacket of electrical insulating material for the portion 166c of 166b which extends through the wall of 151. The tube 156 extends along the outer wall of 151 and is secured thereto by means of brackets 156'. Tubing 156 is positioned relative the other stationary portions of the apparatus such as the brush mount 22 so as not to interfere therewith as it rotates. Another slip ring or commutator may also be provided on the other shaft as part of the same circuit which includes 160 or as part of another circuit which includes a new resistance heating element secured to the mold wall or liner, and connected thereto by wires and pluggable connectors similar to that shown. If the resistance heating element 159 is a strip of metal it may be provided per se on an insulated coating or sheet secured to the surface or 152 or may be secured in channels or on the surface of the inside wall of 151 provided that the latter is made of an insulating material such as ceramic or ceramic glass. If 151 is made of metal, a ceramic or porcelain layer may be applied to its inner surface to both electrically insulate the conducting member 159 therefrom and provide a degree of heat insulation to prevent the transfer of heat through the walls of 151 during the heating part of the cycle.

A further construction involves coating the entire surface of the liner 152, outside and inside with an insulating material such as a ceramic frit or porcelain and solidifying said material at temperature, after the resistance element 159 has been applied to 152 and is covered by said outer coating and after the ducting portions 153 have been formed therein. It is noted that by providing a multiple plug receptacle or connector in place of the single pole connector 166b, that is, one which has a single input for receiving plug 166a and multiple branch outlet lines, conducting wires may be extended therefrom to various separate heaters secured to different areas of 151 or 152 or to areas of the lid for the mold. The electrical conducting means of FIG. 11 may also be used to connect control wires to servo devices mounted on the mold 150 such as motors or solenoids for the automatic opening or closing of the lid or door secured pivotally to flange 151' or for performing other operations on the mold or molding cast therein.

In FIG. 11a is shown in cross-section a fragment of a modified form of the ducted sheet of FIG. 11 which is referred to by the notation 152A. The sheet 152A may be applied to the molding apparatus of FIG. 11 or to any apparatus employing a flowable fluid and an electrical resistance heating element for heat transfer purposes. The heat transfer sheet 152A has one or more tubed portions 153A formed therein and preferably projecting from but one surface thereof as shown. The tubed sheet portion of 152A, referred to by the notation 152b, is preferably formed by roll-bonding from two sheets of metal with a stop weld material placed in a strip pattern therebetween which prevents the interfacial welding of the two under pressure and heat applied to the outer surfaces of both, after which the non-fused interfacial area between the two is inflated with a pressurized fluid resulting in the expansion of the wall 153A and the provision of the volume 153A' or duct. The ends of the ducting 153A preferably extend to an edge or edges of the sheet 152B and are connected to inlet and outlet lines for a fluid to be passed therethrough as shown in FIG. 11. After forming the one-side-flat tubed sheet, a first coating 152C of a ceramic material as described is applied to the flat surface of the sheet and heat fused thereon after which an electrical resistance element such as a thin flat strip 159', is applied thereover preferably directly adjacent and following the ducting 153A as shown although 159' may run along said sheet in any desired pattern or direction. A coating of porcelain or other ceramic material may be applied to the other surface of the tubed sheet 152B including the duct portion 153A thereof for protecting said surface from heat corrosion either during the application of heat to the other surface to fuse the layers 152C and 152D or during the operation of the heat transfer sheet at temperature or in a medium transferring heat thereto.

Modifications to the fluid carrying and electrical resistance heated sheet 152A of FIG. 11a have been noted and elimination of certain of the described elements or layers may be made depending on the intended function of the sheet. For example, if it is desired to use the sheet 152A for the purposes of heating and cooling a material placed adjacent thereto as in FIG. 11, it may be provided as illustrated in FIG. 11a or the heating element 159' and layer 152D may be eliminated. If it is desired to use the sheet to heat a liquid passing through 153A', 159' provided in the position adjacent to and running along the wall of 153A', said structure may be utilized to attain substantial heat transfer efficiency.

In FIGS. 12 to 15 apparatus is provided for slush molding articles preferably from a pre-mix of a hot molten plastic which solidifies upon contact with the relatively cool walls of a mold 30' thereof. A mixture of high and low-molecular weight polyethylene powders or granules is placed in a hopper 170 fed to and heated in a pre-heat chamber 171 and blended in a mixer 172. The molten blend, preferably having a viscosity in the range of 5000 to 10,000 centipoises and at approximately 300 to 400° F. is flowed into injection cylinder 175 and injected by ram 173 through a rotary coupling 176 and a duct 179 through the center of a shaft 178 which rotates the assembled mold 30' by means of a drive comprising a sprocket wheel 178' secured to 178, a closed loop chain 178c driven around a sprocket coupled to the shaft of a motor 178M secured below. Thus the plastic may be injected through passes 179 which extends to the interior volume 30'd of 30' per se or by means of a one way valve, not shown, but which may be provided in the end of duct 179.

An electrical resistance heating wire or induction heating coil 177 circumscribes shaft 178 for maintaining it at a predetermined temperature. Coil 177 may also comprise an induction coil energized by a high frequency generator in the base 178b, and may be operative at predetermined intervals to heat shaft 178 so that plastic in the duct 179 thereof will not solidify due to the wall cooling thereof. The rest of the apparatus including the mold 30', the other shaft 180 and its slide bearing and supports 183, 183' and the lineal actuator 182 for 180 and base 15' may be made in accordance with the hereinabove teachings so that the mold 30' may be opened for the removal of the casting therefrom by actuation of power cylinder 182. The operation of injector ram 173, the power on-off switch, for the means powering 178' to heat 178, the start and stop controls for motor 178M and the ram of mold actuator cylinder 182 may be controlled by push-pull bi-stable solenoids controlling respective control switches or valves to said cylinders which solenoids may be controlled in a predetermined sequence and at predetermined times in a cycle by means of a multi-circuit cycle timer which is resettable by a push-button switch controlled by the operator. The operational sequence may include (a) advancement of 31a to close against 31b and seal therewith, (b) heating of 178, (c) operation of 173 to inject a predetermined amount of liquid plastic into the mold cavity through shaft duct 179, (d) reversal of the piston of 173 to remove most of the plastic from 179, (e) starting of motor 178M, which may also be operating while plastic is being injected into the mold, (f) starting of the motor which rocks or rotates platform 15', (g) stopping at a predetermined time thereafter of either or both of said motors, (h) actuation of the piston of 173 to draw off excess liquid from the mold by an injector nozzle projecting into the cavity as taught in FIG. 15 and (i) separation of the mold halves by the actuation of 182 in reverse to withdraw 31a from 31b. The cycle may also include the automatic injection of air into the mold to cool the molding and to support it after the excess is withdrawn. Said air may be injected through passage 179 or through a pipe running parallel to 179 and fed through a rotary coupling. If 30' is rotated fast enough air pressure support of the molded shell will not be necessary.

Details of the rotary coupling 176 of FIG. 12 are shown in FIG. 13. The injector cylinder 175 feeds to an opening 179' in head 176 which has a tapered nose section 176' of substantially the same shape as the surface of a cavity in the end 178a of shaft 178. A tapered roller bearing 184 is engaged in shaped recesses in the faces of 176 and 178a and permits the engagement of the two and rotation of 178 while it is supported by 176. A metal or Teflon sealing O-ring 185 seated in a groove 178a as shown provides a seal across the adjacent surfaces of 176' and 178a. The shaft 178 is shown as being made of two members, an inner shaft 186 through which 179 is bored and an outer shell 186' assembled therewith which extends to or is secured to flange section 178a.

An electrical resistance heating element 186R is spirally wound in a groove provided in 186 and is used for heating said shaft. Element 186R is electrically connected to an external power supply by means of slip rings 187 insulatedly mounted on 186 and brushes 187b secured below which are in series circuit with a power supply.

The embodiment of FIG. 14 shows means for feeding liquid plastic to the mold cavity through the axially movable shaft 180 which slides and rotates in bearing 183 supported by upright 183'. A stationary casing 188 is provided in the form of an annular chamber with ring-like flanges 188F each of which is rotationally sealed with the surface of 180 by means of respective O-rings 188s and 188's engaged between spaced-apart ring portions 188R of the shaft, said shaft and annular grooves in 188F. The housing 188 thus is provided having a closed volume 188c which communicates through a hole H in 180 with an axial bore therein extending through wall 31a to the interior volume of the mold. A long rigid tube 189 is connected by means of a fitting 189F with its interior communicating with 188c and a flexible hose 189H extending from a cylinder such as 175. 189 is slidably supported by a slide bearing 189B secured to the support 183 for bearing 183B. As 180 is moved axially one of two ring portions or circular shelves 180R bear against the inner face of 188 and carry said housing therewith. Tube 189 is axially guided in 189B and prevents 188 from rotating. Shaft 180 may be heated as described.

FIG. 15 shows details of an automatic injection device which may be used in the various embodiments described herein and which is provided for performing one or more molding fluid injection and/or removal operations relative to a mold. The notation 30'a pertains to any portion of a wall or cover for a mold having a totally enclosed volume 30i. An opening 30'H is provided through said wall through which an elongated nozzle or tube is movable. The numeral 190 refers to a tubular support for an injection nozzle 191 and may either be one of the shafts 178 or 180 of FIGS. 12 to 14 which are secured to 30'a for rotating said mold or an assembly as provided in FIG. 16' which is projectable by means of an air cylinder or motor to cause 191 to pass through 39'H when in alignment therewith. The nose end 191' of nozzle 191 may be tapered or rounded as shown by broken outline 191'a so that it will easily pass through semi-molten plastic.

In FIG. 15, 191 is shown with a spur gear track 193 formed in a surface of 191 along part of its length which is engaged by a spur gear 194 mounted on the shaft of a gear motor 195 secured to 190 so that if the latter is adapted to rotate with mold 30'a, the motor rotates therewith. Electrical power from an external source is conducted to 195 through brushes 187B contacting a slip ring 187 mounted on an insulating bushing 187' secured to 190 and through wire 196 connected to the terminals of 195. An O-ring 197 held in a groove in the rear end of 191 engages the surface of the bore 179 through 190 through which fluid such as a thermosetting plastic or other material or gas flows to prevent said fluid from flowing between the annular space between the 190 and 191. A second seal 197' which is a deformable ring which is secured in an opening provided in 30'a, has an inside diameter smaller than the outside diameter of 191 and prevents leakage of liquid injected into 30i. Thus 191 may be projected a predetermined degree into 30i while pressurized fluid is injected therethrough or suction applied upstream of 179 to remove fluid from 30i. Nozzle 191 may also be totally withdrawn from volume 30i by control of the rotation or operation of motor 194. The numeral 183 refers to a bearing for supporting 190.

The apparatus illustrated in FIG. 16 shows means for rotating plural molds 30a, 30b, 30c, etc. or mold housings of the type heretofore described and for simultaneously opening and closing said molds. A frame 200 mounted on a shaft 210 pivoted on end-bearings 211 which are supported in a fixed attitude below, also mounts a pair of sub-frames 202 and 203 each of which engages respective pillow blocks 207 for supporting the shafts 11 and 12 the other end of which are secured to respective halves of molds 30. Further subframes 208 and 209 mount the brush mounts 22 which support respective brushes riding on slip rings on the shafts 11 and 12 for conducting electrical energy through leads 19 to respective resistance elements which are secured inside, on the outside or embedded within the walls of said molds as described.

The frame 202 when moved by air or hydraulic cylinders 205 and 205' carry the pillow blocks 207 therewith together with the shafts 12, mold halves secured thereto and the subframe 209. Actuators 205 and 206 are secured to a projecting portion 204 of frame 201. The single electric motor 208 is secured to 201 in a position near the end and drives a closed loop chain 209' which engages sprocket wheels secured to the ends of shafts 11 beyond the pillow blocks 207.

In FIG. 16' is shown apparatus, applicable to the apparatus of FIG. 16 as well as to the other molding apparatus heretofore described, for automatically filling and operating said apparatus. One of the molds 30 is shown in end view rotatable on a shaft 11 by means of a motor 208 rotating said mold through sprocket 208', chain 209' and sprocket 209 secured to shaft 11. The motor 208 is controlled to start and stop by means of a controller 219 having a control F which, when energized by a pulse at its input, starts up and a second control S which stops said motor when a pulse is present at its input. Mounted on a frame 213 supported above the mold are an air cylinder 215 having a ram positioned to advance an injection cylinder 216 including an injector and ram, which essentially comprises the combination of elements 173, 175, 176 and an injection nozzle as heretofore described for FIGS. 12 to 15 for injecting a predetermined quantity of a heat curable material such as a vinyl plastisol or the mentioned LMW polyethylene at 250 to 400° F. The injector 216 is projectable from a retracted position by 215 whereby its nozzle 216N clears the mold 30 so that the latter may oscillate or rotate to a position when an injector valve 250 mounted in the wall of 30 and having an opening alignable with 216N may penetrate said valve and inject a predetermined quantity of said plastic therein. The injection action may be carried out as a single shot, or a series of injections each time after the reservoir of 216 is refilled through line 214 from a supply reservoir 212 of said plastic secured above.

Automatic control of the apparatus of FIG. 16' may be effected by an automatic programmer 217 for providing programmed electrical energy or pulse signals to energize respective solenoids for opening and closing switches to control drive motor 208 and fluid valves controlling the movement of the illustrated pneumatic or hydraulic ram 215 and the injector ram in 216 for respectively advancing cylinder 216 and injecting the plastic fed thereto from 212. The programmer 217 in its simplest form may be a multicircuit cycle time which automatically resets and starts a control cycle when a switch 217' is actuated. The sequence of operation of 217 is as follows:

Assuming that mold 30 has received a predetermined quantity of liquid plastic and the injector is retracted, switch control 217' is actuated starting the operation of programmer 217. A first control signal from 217 energizes start control F of motor 219 and it drives mold 30 in rotary or oscillating motion. Thereafter, a servo such as a linear motor or other device 41 as described in FIG. 1 is energized to rock the platform 200' on which motor and bearings for 30 are mounted to change the attitude of the axis of rotation of the mold. If 41 is solenoid operated, a signal from 217 thereto will cause its operation when said signal is present at said solenoid. Flip-flop solenoid controls may also be employed whereby 41 is started in operation to project its ram upon receipt of a first signal from 217 and stopped or retracted upon receipt of a second signal therefrom. A pin 209P on the chain is adapted to strike the actuator of a limit switch 218 each time said pin passes to effect closure of said switch. Switch 218 is in series circuit with a power supply PS and provides a signal each time it is closed by 209P to the input of a normally open gate or switch 218'. The latter will not pass said signal to the stop control S of 219 until a signal from 217 is present at the switching input of 218'. After 218' is closed by a signal from 217 the next time 218 is closed by pin 209P the resulting pulse passes to stop control S of 219 and the motor 208 is thereby stopped in a predetermined manner whereby the valve 250 is positioned in alignment with the injector 216N of 216. A signal from 217, after 30 has so come to rest, is thereafter passed to a first input of a solenoid 215' associated with 215, opens a valve gating working fluid thereto which advances 216 and controls 216N to be projected through the valve 250 in the manners illustrated either in FIG. 15 or FIGS. 21 and 22. If the injector of FIG. 15 is employed, the multi-circuit timer may be used to control the operation of motor 195 in any predetermined manner. The injector 216 may be operated by means of a solenoid 216' operating a valve to remove excess liquid plastic from the cavity in 30 and/or to inject a different material therein for filling, inflating, curing, heating or cooling the interior of the casting. Controller 217 may then activate control 215" to control 215 to retract 216 by means of a signal controlling the solenoid 215 thereof and the mold rotated by starting motor 208 when a start impulse is passed to F of 219, or the mold may be automatically opened by separating one of the halves by a signal from 217 to the solenoid controlling the mold-half movement servo such as 205 and 205' of FIG. 16.

The control cycle may also comprise a sequence starting with closure of the mold initiated by a control signal generated by controller 217 and operative to cause the cylinder 205 to advance to a position where it stops, in a position to retain or lock the mold sections together. The cycle includes the next steps of actuating 215 as described to advance 216N to pass through 250, maintaining the plastic inlet valve closed for a predetermined period by a signal from 21 or of predetermined duration for activating solenoid 216', followed by closure of said valve and retraction of 216 thereafter by deenergizing 215' after which motor 208 is started and runs for a predetermined time and the described cycle repeats ending with the retraction of the mold-half opening the mold. If an automatic device for removing or stripping the casting or molding out of the mold is employed, its operation is interlocked to the cycle of operations by means of timer 217 and controlled thereby to advance and remove the molded article after the mold has opened. The flow of a cooling or heating fluid through the mold or its housing, those mechanical operations which are described elsewhere in this application, may also be controlled to occur at predetermined points in the cycle by the provision of solenoid operated valves and flow controls therefor which are controlled or operated by the programmer 217. Similarly, the mold wall heating elements may also be controlled to be energized or deenergized at predetermined points in the cycle by switches in their power circuits controlled by controller.

FIGS. 17 to 21 illustrate further details of mold or heavy walled container construction applicable to this invention or the molding of other materials such as the injection molding of plastics or metals or the casting of metals, ceramics and the like. In the cooling or heating of molds having heavy walls, and made of metal, the conventional technique is to provide a network of ducts in the walls thereof by drilling long holes and plugging or otherwise sealing off the ends of all of said holes except those at which the heat transfer liquid enters and exits from said network. The procedure is time consuming and costly and requires that the walls be more than double the thickness of a mold or die not requiring such cooling. The mold 300 of FIGS. 17 to 21 is box shaped and made of metal although it may have any convenient shape and may be made of ceramic or ceramic glass and has front and rear walls 301, 302 and side walls 303, 304. Assembled and closely abutting the front and rear walls 301 and 302 of said mold and the outer surfaces thereof are respective tubed sheets 301 and 302. The tubed sheets preferably have their surfaces, which abut the outer surfaces of the walls 307 and 307', flat and secured thereagainst by means of a plurality of small fasteners F such as screws turned tightly into threaded holes in the mold which are sufficiently closely spaced together to secure the entire flat surface of their respective tubed sheets in clamping engagement with the surface of the respective mold wall so that heat transfer from said mold wall to said sheet will be effected essentially by conduction. The numerals 310 and 311 refer to brackets or arms for supporting the mold which may extend to further means as described for moving the mold. A top for the mold may be provided and the numeral 306 refers to a second section or bottom for said mold. If the mold is to be used for injection molding, it may be longitudinally divided into two sections which are capable of being separated from each other for removing the molding therein.

Since the exterior of a mold of the type shown in FIGS. 17 and 18 is generally subject to rough handling in use or when conveyed to or from the mounts 310 and 311, I provide means for protecting the tubed sections 308 of the sheets 307 and 307' from being collapsed or punctured by blows from objects striking thereagainst. The tubed sheets of FIGS. 17 and 18 are mounted in respective indentations 309 in the side-walls of the mold whereby projecting shelves 309' are provided at the sides of said indentations and ends of the walls or edges of the mold which serve to protect the protruding walls of the tubed portions 308 of the tubed sheets from damage should the side of the mold swing against or be struck by a member which engages the ridge-like sections 309' but does not penetrate said cavity. As a further protective means, a plate of metal such as 312 may be fastened across the projecting lands 309' to prevent the penetration of the cavity by an object or protrusion from a machine, wall, etc. The protecting shield 312 may also serve another function when shaped as shown to engage part of the surface of the tubed sheet 307 between the ducted portions thereof. It may be used to clampingly engage said tubed sheet against the surface of the mold when it (312) is fastened to the lands 309, thereby eliminating the need for most of the fasteners engaging said tubed sheet against said mold wall. Land portions 314 project from the body 313 of the plate 312 to a degree such that they tightly engage their respective tubed sheet solid portions 308' between the tube portions 308 against the surface of the mold. The ridge members 314 may be machined from the metal forming the base plate 312 or may comprise strips of metal welded thereon or secured thereto with fasteners. Said protrusions 314 do not extend to where they would intersect and bear against a portion of the tubed section 308 of sheet 307 and the numeral 308' refers to area of the sheet 307 where the lands 314 may bear against, thus indicating the possible degree of extension or contour of the latter.

FIG. 19 shows further details of the tubed sheet and protecting member 312. The integrally formed land section 309' of FIG. 23 is replaced in FIG. 19 by a rectangularly shaped bar 309" which is held by means of a machine screw F' fastening it and 312 to the mold when it is engaged in a threaded hole in the surface of the mold wall. Further fasteners F" may also pass through holes extending through the centrally located land sections 314 as shown to enhance the mounting of the member 312 against the mold.

Details of means for securing tubing to the ducts 308 formed integrally in the sheets 307 and 307' are shown in FIGS. 20 and 21 as well as FIG. 18. In FIG. 19 the duct 308 formed in sheet 307 is shown as beginning and terminating at an edge of said sheet near the lower righthand corner thereof. A tube 316 is secured in a recess 315 in 309' shaped at one end whereby it will engage in the edge opening of the duct 308 and is soldered or welded thereto. The other end of 316 is preferably cylindrical in shape and is assembled with a tubing fitting 317 of conventional design which couples 316 to a section of flexible hose or tubing 318 which is held by a bracket 319 secured to the frame or arm 311. The tubing 318 extends from a pressurized source of heat transfer liquid which may be water at a relatively low temperature, if it is desired to cool the walls of the mold 300 or any suitable liquid at an elevated temperature if it is desired to heat the walls of the mold. If it is desired to first pass a hot liquid to heat up the mold prior to casting or injecting a liquid molding material therein, and later follow with a cooling liquid, the tube 318 may be connectable to pressurized sources of each by means of a two way valve connecting one or the other to 318. The line 318', which is secured to a tube fitting similar to 317 which is connected to the other end of the duct 308 via a section of tapered tubing similar to 316, extends to the exhaust side of the recirculating fluid system of which 318 is on the inlet side thereof. Tube 318' is also secured in position by bracket 319, so that when said two lines are uncoupled from their respective fittings and the tubes 316 for removal or replacement of the mold 300, they will remain in place and will be prepositioned for recoupling when the new mold is positioned in the fixture or the mold is replaced. The view of the corner of the mold, FIG. 20, and the cross-section therethru, FIG. 21 show details of the tubing section 316 and the assembly. A channel 315 is cut thru the land portion 309' to accommodate 316 in line with the end of the ducting 308. The end 316T of the stainless steel tube 316 is pushed into the opening in 308 at the edge of the sheet and welded thereto. The tube fitting 317 preferably abuts the face of the end-wall 303 of the mold 300 and a washer 317" may be clampingly engaged between said fitting and said wall face so that there will be no tendency for 315 to bend over the edge of the mold wall. If a cover plate 312' is secured with fasteners F against the projecting portions 309 of the mold as shown in FIG. 21, it will not only protect the tubed sheet but may confine 316 against the base of the cut-away or channel 315. Such an assembly will prevent bending of the tubing 316 and lifting of the sheet 307 off the wall 301 of the mold regardless of forces imposed on the tubing 318.

FIGS. 22 and 24 show details of molding apparatus for producing articles from molten plastic such as blends of high pressure and low pressure polyethylene provided in the temperature and viscosity ranges as described heretofore or any suitable plastic material which will solidify as described by a process which will hereafter be referred to as "plunger molding." Plunger molding is a low pressure molding process in which an article is caused to flow in a mold of at least two parts, while in a hot molten condition at essentially a constant pressure as the result of a part of said mold, which will be referred to as a plunger, compressing a quantity of said hot molten plastic against another part or cavity of said mold such that said plastic is caused to flow and fill a volume which is partially defined by said plunger.

FIGS. 22 and 23 illustrate respectively the two primary steps involved in plunger molding even though the details of the molds vary in the two figures to illustrate possible design variations therein. In FIG. 23 a first mold section 400 is provided having a nose or plunger 406 extending from a base 402. The nose 406 is moved and guided by means from a retracted position relative to a mold in alignment with a cavity thereof to a fully projected position such as that illustrated in FIG. 23 whereby an annular volume in which an article is molded by means of a plastic material caused to flow therein. The female portion of the mold, 411, in FIG. 23 comprises a cylindrical cup shaped housing or mold closed at the bottom and opened at the top, the bore 413 of which is of greater diameter than the diameter of the plunger 406 and of a length such that a lateral surface of the base portion 402 will engage the upper surface 414 of the walls 412 of the female mold 411, with the bottom of the plunger a predetermined distance away from the bottom surface of 411. The walls of the female mold portion 411 are secured and held by a frame or plate 416 which is secured to or forms the top of a container 415 of a liquid 420 circulated therethru for cooling said mold. In the operation of the apparatus, a predetermined quantity or puddle 422 of molten thermoplastic is provided in the bottom of the cavity 413 in 411 which may be admitted thru an opening 406' extending thru the plunger nose 406 or by means of a filling nozzle when 406 is fully retracted away from the cavity in 411. The quantity of said molten plastic is such that when said plunger is advanced or projected with the surface 403 of base 402 engaging the upper surface 414 of 411 said plastic will fill the annular volume defined by said plunger and the wall of the cavity in 411.

If a molten polyethylene blend having a viscosity in the range of 5000 to 12,000 centipoises in the temperature range of 250 to 400° F. is used and the plunger 406 is advanced into the cavity in said mold within less than several seconds after said plastic is admitted to said cavity, since the plastic material flows quite easily, it is not necessary to advance the plunger with great force or to utilize heavy walled construction for the cavity portion of the mold or, for that matter, a relatively heavy or strong plunger. In this respect and in the manner in which the material flows and solidifies, the process is considerably different from compression molding which requires pre-heated molding powders or pellets placed in a cavity of a mold with the resulting article being formed by the gradual increase in pressure and temperature by means of the mold for the compound to become fluid and flow. Apparatus for plunger molding so called low pressure plastics may be made relatively light, due to the formation of the article at essentially constant pressure, and hence is relatively inexpensive, simple to produce and easy to maintain.

Since low pressures are required, the plunger assembly may be urged to move by a simple valve controlled air cylinder the ram 404 of which 404 is shown in FIG. 23. Unless the cylinder is well cushioned by the provision of a socalled hydrocheck to slow down at the end of the stroke, a function which may cause some of the plastic to escape due to the momentum imparted thereto and the fact that the annular surfaces 403 and 413 may not mate and seal off the annular molding volume between 406 and the surface of 412, one or more shock absorbers 410, is the form of resilient pads or blocks of rubber or the like which are seated in recesses 408 in 402, may be provided for reducing the shock effects of impact when the surfaces 403 and 414 engage each other. These pads which may comprise a flat ring of rubber are provided beyond the annular surface 403 which serves as a means for sealing the annular molding volume when engaged with 414. The pad or pads 410 may also be replaced by a metal, Teflon, or rubber O-ring seated in a groove and held against either 402 or 414.

Since the time it takes for the plastic to solidify in the mold cavity defined by the plunger and the surface of the female mold cavity will depend on the temperature of said components and will be a substantial part of total cycle time, it may be desirable to cool both mold components not only during molding but during the time it takes to remove the piece and recharge the mold. The method employed in FIG. 22 employs the continuous circulation of a cooling liquid such as water around or past the one or more sections 412 which comprise the female portions of said mold. In FIG. 23 a female mold 400' with a heavier wall than that of FIG. 22 is utilized, past or through which is flowed a cooling liquid through a plurality of ducts 424 which are shown as holes through the block of 400'. The male portion 406 of the two piece mold may also be provided with cooling means such as illustrated in FIG. 24. A hole 426 is drilled or otherwise provided partially through the nose 406' to near the end thereof and a baffle 427 is secured extending partially through said hole so that liquid flowed along one side of the baffle will travel to the end of the hole and return up the other side thereof thus circulating through the nose. The ducting formed in the male mold portion 406' is connected to a pressurized source of fluid for circulating it as described and cooling said nose or plunger. In FIG. 24 the under-face of the female portions of the mold 400'' is cooled by spraying water thereon from holes H provided in the walls of ducts 432 of a tubed sheet 430 constructed as described, said tubed sheet being secured to the bottoms of the female portions of the mold as shown by means of fasteners. The tubed sheet 430 also serves as a heat transfer means for removing heat from the bottom wall 412 of the mold by conduction thereto. Holes 431 in sheet 430 permit removal of water introduced against the mold through holes H.

Further details of low pressure plunger mold design are also illustrated in FIG. 24. The numeral 438 refers to a sub-cavity formed upon assembly of the two mold sections having a narrow restriction 434 extending thereto from the main cavity 433 and is utilized to account for any excess plastic which may have been admitted to the female cavity before the motion of the plunger. When the plunger portion 400 is removed from the cavity portion the material flowing into 438 may be broken off from the piece formed in mold cavity 433 without difficulty due to the thin section formed in the restricted volume or gate 434. The notation 433' refers to a lateral portion of the main cavity for forming a different article therein by the flow of the plastic originally admitted to said main cavity to said sub-cavity 433'. A restricted gating cavity 433a joins 433 with 433' and is formed upon assembly of the two mold sections as shown which forms a gate which may be severed from the parts formed in the two cavities 433 and 433'. The volume 433' may also serve as an overflow cavity and function in the same manner as 438.

I claim:

1. Apparatus for the rotational molding of articles from a fluent plastic material charged into a mold comprising in combination with a mold made of at least two separable mold sections and having a cavity defined by said mold section, each of said mold sections being rotatably mounted on a first base member, a rotary support for said first base member, motor means for oscillating said first base member on said rotary support, a motor mounted on said first base member which is adapted to rotate said mold, a guide means for guiding at least one of said mold sections in movement relative to said first base member between limits of travel which comprise a first position in which the movable mold section is in engagement with the other mold section and the mold is closed and in condition for molding and a second position in which the mold sections are separated and in which the molded article may be removed from the cavity without interference from either of said sections, means for retaining the mold sections together when in engagement with each other whereby the rotation of one will effect rotation of the other, a motor means for power operating said movable mold section between its two positions to effect the closure and opening of said mold, and a movable coupling means for connecting power to said motor rotating said mold and the motor means for power operating said movable mold section, a heat transfer means in the shape of a heat transfer panel secured to the wall of said mold for heat transfer relative thereto by conduction, and a coupling for said heat transfer panel part of which is fixed relative to said first base member and part of which rotates with said mold.

2. Apparatus in accordance with claim 1, said mold being made of two separable parts, said parts shaped to define a cavity upon assembly of said mold, a rotatable support for each of said mold parts being secured to a respective rotatable support, one of said rotatable supports being axially movable, and means for moving said axially movable support to cause said mold parts to assemble and to separate respectively prior to and after molding an article therein.

3. Apparatus in accordance with claim 1, said heat transfer means comprising an electrical resistance heating element in abutment with and secured to a wall of said mold and extending along a sufficient area thereof to heat said walls a predetermined degree when an electrical current is flowing through said element, means including a disconnectable connector for connecting said resistance heating element to a conductor extending to said rotational support for said mold, and a rotary electrical coupling means rotational supports for conducting electrical energy from a fixed power supply to said resistance heating element as said mold rotates.

4. Apparatus in accordance with claim 1, said heat transfer means for said mold comprising a fluid and a system for flowing said fluid in close proximity to said mold, said system including a pumping means, an outflow ducting means from said pumping means, extending to a first coupling, said first coupling comprising a rotary fluid coupling mounted on said rotational support for said mold to which said outflow ducting means is connected, a second ducting means connected to said first coupling extending to ducting means adjacent the inside wall of said mold, a third ducting means connecting said second ducting means to a second fluid coupling, a fourth ducting means connecting said second fluid coupling with means for flowing said fluid to the inlet of said pump.

5. Apparatus in accordance with claim 4 including an electrical heating element secured adjacent said mold wall for heating said mold, said fluid heat transfer means adapted to cool said mold wall, and means for automatically controlling said electrical element to heat said mold and said fluid ducting means to conduct coolant fluid at predetermined times in a molding cycle whereby to alternately heat and cool said mold walls in a predetermined manner.

6. Apparatus in accordance with claim 1, a first of said mold sections being secured to a rotatably mounted shaft which is coupled to said motor for rotating said mold, a second mold section being secured to a rotatable supporting means, part of which is adapted for both free rotation and axial movement for opening and closing said mold, a motor means coupled to said second rotatable supporting means for moving said mold section in closing and opening said mold, and means for retaining said mold sections fixed relative to each other when said mold parts are abutted whereby when said motor driven mold section is rotated the other mold section will rotate therewith.

7. Apparatus in accordance with claim 1, including an automatic control means for controlling said motors in a predetermined sequence of control to oscillate said first base member and rotate said mold for a predetermined time and to open said mold thereafter by operating said motor means driving said movable mold section to its opening position after the article molded in said mold has solidified.

8. Apparatus in accordance with claim 7, said heat transfer means comprising a fluid conduit system a servo operated means for controlling the flow of a heat transfer fluid through said conduit, part of said fluid conduit being in intimate contact with the wall of at least one of said mold sections said automatic control being also operative for controlling said servo to control the rate of flow of heat transfer fluid to said mold in a manner during a molding cycle whereby the rate of solidification of a molding material admitted to said mold is solidified.

9. Apparatus for molding comprising in combination with a portable support for a plurality of molds with molds secured thereto in fixed positions, a rotatable shaft with means extending radially therefrom for securing a plurality of mold heating boxes, a plurality of mold heating boxes secured to said securing means, each of said heating boxes having means for heating respective enclosures and being adapted to receive respective molds secured to said portable support when said support is in a predetermined alignment therewith, means for securing said portable support in a fixed position relative to said shaft with said molds centered in each of said heating box enclosures whereby said enclosures are closed off as a result of said assembly, means for rotating said shaft while applying heat to said molds by means of said heating means of each of said heating boxes for heat curing material placed in said molds, means for changing the attitude of said shaft and said portable mold support while rotating said shaft whereby to cause said material in said molds to flow over the entire interior surface of the cavities of each, and means for releasing said mold portable support means and said molds from the means holding said heating boxes and removing it therefrom after stopping the rotation of said shaft and replacing said mold assembly with a new assembly of molds positioned in said heating boxes without the need to wait for said molds to cool off before removing material therefrom and receiving a new charge of material.

10. Molding apparatus including a mold for forming an article in a cavity therein by pouring a hardenable material into said cavity of said mold and solidifying said material by applying heat to the wall of said mold, said mold comprising an assembly of mold sections which are capable of being abutted together in a manner to effect a seal of said cavity and of being separated for the removal of a molded article therefrom, at least one of said mold sections having an electrical resistance heating element secured thereto and embedded in an insulating material coating the inside wall of said mold, said insulating material and said electrical heating element extending from the interior surface of said mold section and along a surface thereof which abuts a surface of the other of said mold sections upon assembly of said sections to effect said seal, and means for connecting an electrical conductor extending from an exterior power supply to said embedded electrical heating element through said insulating material at a point on the surface of said mold which is exterior of the area thereof which engages the other section of said mold and seals said mold.

11. Molding apparatus including a mold for forming an article in a cavity by pouring a hardenable material in liquid form into said cavity and effecting a heat transfer to harden at least part of said material on the wall of said mold, said mold comprising an assembly of rigid mold sections having surfaces adapted for sealing engagement with each other, at least one of said mold sections having a tubed sheet liner secured thereto, said liner comprising a pair of sheets of metal integrally welded together except at areas defining a tubular conduit which consists of expanded areas of at least one of said sheets, at least one of the walls of said conduit being in surface abutment with a wall of the mold section to which said liner is secured along substantially the entire length of said conduit, fluid inlet and exhaust piping connected to said liner conduit and supported by the wall of the mold section, and means for flowing a heat transfer fluid through said liner conduit after molding liquid is admitted to said cavity whereby to effect the hardening of said liquid on the walls of said cavity.

12. Molding apparatus in accordance with claim 11, the inside surface of said tubed sheet liner comprising the inside surface of said mold and being relatively flat, the other surface of said liner having expanded areas defining the wall of said conduit, the interior surface of said mold wall having surfaces which abut the outward surfaces of said liner between the conduit portions thereof, and having indentations formed in the mold wall to accommodate said expanded portions of said liner, and means for flowing a heat transfer fluid through said liner ducting which varies in temperature in a predetermined manner during a molding cycle.

13. Apparatus for molding comprising a plurality of molds each having a mold section mounted on a respective rotating shaft and a second mold section assemblable with said shaft mounted section, said second mold sections each being secured to respective shafts which are adapted for simultaneous longitudinal motion for opening and closing the molds, a common drive means for all of said rotating shafts, said rotating shafts being supported in bearing on a base, the shafts of said second sections being connected to a common movable supporting means adapted for longitudinal motion therewith, and means for moving said common supporting means to advance said second section of said molds to engage respective rotatable sections in a manner whereby a liquid seal is effected for each assembly and said second mold sections will rotate with the rotating shaft mounted mold sections, said apparatus including a common base member having mounted thereon bearing means for said rotating shafts and a means for moving said base member in a predetermined path to change the attitude of the axes of rotation of all of said molds while they are rotating.

14. A fluid cooled mold for molding thermoplastic materials cast therein at elevated temperature comprising the combination of a rigid mold body having a cavity therein including an opening in the walls of said mold for the admission of a molding material to said cavity, a frame for supporting said mold, means for securing said frame to the exterior of the walls of said rigid mold body, and a tubed sheet of substantially less thickness than the thickness of the walls of said mold body, said tube sheet having a conduit integrally formed of the walls of said sheet, at least one of the major surface of said tubed sheet being in abutment with a major portion of the exterior surface of the walls of said mold, means for maintaining a major surface of said tubed sheet in intimate contact with the exterior surface of said walls of said mold, an inlet to the ducting of said tubed sheet including a section of tubing supported by said frame, and means for flowing a cooling fluid through the ducting of said tubed sheet whereby heat conducted to the walls of said mold from material molded therein will be conducted therethrough and through said tubed sheet to the fluid circulating therein and will be transferred thereby away from said mold.

15. A fluid cooled mold in accordance with claim 14, major portions of the outer surfaces of said mold walls being recessed below other portions thereof and having said tubed sheet integrally secured in said recessed wall portions and abutting said recessed surfaces, and a rigid protection means extending across the recessed portions of said mold to prevent the contact of the ducted portions of said tubed sheet with members which may strike said mold, said rigid protection means also adapted when assembled with said mold to engage said tubed sheet adjacent the ducted portions thereof under compression whereby the other surface of said tubed sheet is compressively engaged against the recessed surface of said mold, there being a plurality of openings in said ducted portions of said tubed sheet for spraying cooling fluid onto adjacent areas of said sheet.

16. Apparatus for the rotational molding of articles from a fluent plastic material charged into a mold, comprising in combination with a mold made of at least two separable mold sections and having a cavity therein the walls of which are defined by portions of each of said sections, said mold sections being rotatably mounted on a first base member, a rotational support for said first base member, motor means for oscillating said first base member on said rotational support, a motor mounted on said first base member having a shaft which is adapted to rotate said mold, a guide means for guiding at least one of said mold sections in movement relative to said first base member between two limits of travel which comprise a first position in which the movable mold section is in engagement with the other mold section and the mold is closed and in condition for molding and a second position in which the mold sections are separated and in which the molded article may be removed from the cavity without interference from either of said sections, a motor means for power operating said movable mold section between its two positions to effect the closure and opening of said mold, and a movable coupling means for connecting power to said motor rotating said mold and the motor means for power operating said movable mold sections, a heat transfer means secured to said apparatus for heat transfer by conduction relative to each of said mold sections, and a coupling for each of said heat transfer means for operation thereof when said mold sections rotate, the coupling for the heat transfer means associated with that mold section which is movable toward and away the other section being lineally movable therewith.

References Cited in the file of this patent

UNITED STATES PATENTS

| | | | |
|---|---|---|---|
| 1,896,919 | Robinson | Feb. 7, | 1933 |
| 1,916,798 | Hottel | July 4, | 1933 |
| 2,084,441 | Howard et al. | June 22, | 1937 |
| 2,274,477 | Howard et al. | Feb. 24, | 1942 |
| 2,305,433 | Kyle | Dec. 15, | 1942 |
| 2,318,377 | Crowley | May 4, | 1943 |
| 2,355,443 | Jeffery | Aug. 8, | 1944 |
| 2,363,329 | Horsfield | Nov. 21, | 1944 |
| 2,495,640 | Muskat | Jan. 24, | 1950 |
| 2,505,540 | Goldhard | Apr. 25, | 1950 |
| 2,536,692 | Miller | Jan. 2, | 1951 |
| 2,543,303 | Rubissow | Feb. 27, | 1951 |
| 2,550,174 | Towner | Apr. 24, | 1951 |
| 2,587,337 | Lay | Feb. 26, | 1952 |
| 2,603,836 | Rempel | July 22, | 1952 |
| 2,626,428 | Bosomworth | Jan. 27, | 1953 |
| 2,659,107 | De Bell | Nov. 17, | 1953 |
| 2,710,990 | Halstead et al. | June 21, | 1955 |
| 2,818,606 | White | Jan. 7, | 1958 |
| 2,834,051 | Rekettye | May 13, | 1958 |
| 2,839,788 | Dembiak | June 24, | 1958 |
| 2,881,476 | Page | Apr. 14, | 1959 |